United States Patent [19]

Okuda et al.

[11] Patent Number: 5,016,132
[45] Date of Patent: May 14, 1991

[54] MAGNETIC RECORDING AND REPRODUCING TAPE GUIDE UNIT

[75] Inventors: Tohru Okuda; Hideo Okada, both of Nara; Takashi Koyama, Tenri; Osamu Okada, Ikoma; Mamoru Nakatsuka, Kashiwara, all of Japan

[73] Assignee: Sharp Kabushiki Kaisha, Osaka, Japan

[21] Appl. No.: 376,645

[22] Filed: Jul. 7, 1989

[30] Foreign Application Priority Data

Jul. 8, 1988 [JP] Japan .................. 63-171305

[51] Int. Cl.$^5$ ............................................. G11B 15/60
[52] U.S. Cl. ............................ 360/130.21; 360/130.2; 360/128; 360/129; 226/196
[58] Field of Search .......... 360/130.21, 130.3, 130.32, 360/76, 128, 77.01, 88, 129, 90; 226/196, 200; 242/198, 199

[56] References Cited

U.S. PATENT DOCUMENTS

| 3,091,764 | 6/1963 | Pillsbury, Jr. | 360/130.21 |
| 3,229,045 | 1/1966 | Bakos et al. | 360/130.21 |
| 3,756,610 | 9/1973 | Naegele et al. | 360/130.21 |
| 3,893,188 | 7/1975 | Shoemaker | 360/130.21 |
| 4,307,427 | 12/1981 | Kawachi | 360/130.21 |
| 4,485,420 | 11/1984 | Schoemakers | 360/130.21 X |
| 4,646,186 | 2/1987 | Tsuchiya et al. | 360/130.21 |
| 4,709,288 | 11/1987 | Schäeffer et al. | 360/130.21 X |

FOREIGN PATENT DOCUMENTS

| 0323188 | 7/1989 | European Pat. Off. | 360/130.21 |
| 59-38915 | 3/1984 | Japan | 360/130.21 |
| 60-59561 | 4/1985 | Japan . | |
| 1155567 | 6/1989 | Japan . | |

OTHER PUBLICATIONS

IBM, Tech. Discl. Bull., vol. 9, No. 10, Mar. 67, p. 1308, "Precision Tape Guide", by Treder et al.

Primary Examiner—Aristotelis M. Psitos
Assistant Examiner—Alfonso Garcia

[57] ABSTRACT

A magnetic recording and reproducing head unit which includes a tape guide unit including a set of spaced two tape guide substrates, a spacer provided between the tape guide substrates so as to dispose the two tape guide substrates through a predetermined distance in an approximately parallel relationship to each other, and guide poles for guiding the surface of a magnetic tape, arranged to extend through front portions of the tape guide substrates in a direction generally perpendicular to surfaces of the tape guide substrates, and a plurality of magnetic heads fixed, in a state where their postures are adjusted, to the tape guide unit.

7 Claims, 5 Drawing Sheets

MAGNETIC RECORDING AND REPRODUCING TAPE GUIDE UNIT

BACKGROUND OF THE INVENTION

The present invention generally relates to magnetic recording and reproducing, and more particularly, to a magnetic recording and reproducing apparatus in which it is required to maintain a synchronous relationship, for example, between reproducing data and recording data.

Recently, in sites for recording music and the like, there have been widely adopted recording systems which employ many microphones to correspond to individual musical instruments, or those in which musical instruments are individually played without playing all the musical instruments simultaneously for recording at each playing. For the recording systems as referred to above, there has been generally employed a multi-channel magnetic recording and reproducing apparatus in which channels are individually allocated to respective microphones and musical instruments for recording, and in a recent trend, the recording system of the magnetic recording and reproducing apparatus is being shifted from the analog system to the digital system.

In the recording by the multi-channel magnetic recording and reproducing apparatus as described above, even in the case where the playing by the respective musical instruments has been simultaneously recorded, it is rare to complete recording by the recording at one time, but normally, so-called punch in/out is effected in which the predetermined performance of a specific channel is repeatedly recorded until satisfaction is achieved. Meanwhile, in the case where a simultaneous recording is not effected, a synchronous recording is made in which playing by another musical instrument is recorded in a different channel, while the sound of the channel recorded earlier is being reproduced. In the multi-channel magnetic recording and reproducing apparatus for effecting the function as described above, it is an essential function to maintain synchronization among the respective channels on the magnetic tape at high accuracy.

In the multi-channel magnetic recording and reproducing apparatus of the analog type, a magnetic head of an induction type is employed, and it is possible to effect the recording and reproducing by the same magnetic head, whereby a high synchronizing accuracy may be readily realized accordingly.

On the contrary, in the multi-channel magnetic recording and reproducing apparatus of the digital system, it is so arranged that a delay is produced between the time at which data is inputted into a circuit or it is outputted from the circuit and the time at which data is recorded on a magnetic tape by the magnetic head or it is reproduced from the magnetic tape. Therefore, in the recording and reproducing by the single head, for example, the punch in/out referred to earlier can not be properly effected. Accordingly, the magnetic recording and reproducing by the digital system is realized by providing at least one reproducing head and one recording head along the travelling direction of the magnetic tape in that order at a predetermined interval.

Moreover, in the multi-channel magnetic recording and reproducing apparatus of the digital system as described above, it is necessary to control a moving distance of the magnetic tape between the preceding reproducing head and the recording head, i.e. the distance on a tape path in a range permissible by a digital signal processing format. A mechanical adjusting mechanism for the above purpose is disclosed, for example, in Japanese Patent Laid-Open Publication Tokkaisho No. 60-59561.

Meanwhile, in the magnetic recording and reproducing apparatuses in general, high density recording with high reliability, and consequent reduction in the consumption of recording medium and smaller size of the apparatus, etc. are required.

The request for the high density recording as described above has been satisfied by attempting to achieve higher density of the track pitch, and reduction of the shortest recording wavelength. More specifically, in the multi-channel magnetic recording and reproducing apparatus, it is necessary to allocate the channel for each microphone or musical instrument, and furthermore, in the apparatus of the digital system, it is required to lower error rate of the data by dispersing into a plurality of tracks for recording information of one channel, thus inevitably necessitating to provision of a large number of tracks for the purpose. As a result, the track pitch becomes, for example, smaller than 100 $\mu$m, which is a marked reduction as compared with that in the conventional apparatuses of the analog system. Moreover, the shortest recording wavelength is now in the order of about 0.6 to 0.7 microns.

In order to achieve a high density recording as described above in the multi-channel magnetic recording and reproducing apparatus, it is necessary for the magnetic tape to travel on the order of microns while maintaining the predetermined positional relationship with respect to the magnetic head. Furthermore, it is also required to achieve a favorable contact state of the magnetic tape with respect to the magnetic gap of the magnetic head, i.e. to obtain a good "head to tape contact" of the head by reducing spacing loss or azimuth loss which are the conditions specific to the magnetic recording.

As described above, the conditions required for the multi-channel magnetic recording and reproducing apparatus of the digital system are as follows.

(1) The distance on the tape path between the preceding reproducing head and the recording head should be accurately controlled.

(2) With respect to the travelling of the magnetic tape, variation in a widthwise direction should be controlled at an accuracy on the order of microns.

(3) A favorable "head to tape contact" should be maintained.

For satisfying the conditions as described above, the multi-channel magnetic recording and reproducing apparatus conventionally adopted is arranged as follows.

In order to accurately control the distance on the tape path between the preceding reproducing head and the recording head, the arrangement as disclosed, for example, in the earlier-mentioned Japanese Patent Laid-Open Publication Tokkaisho No. 60-59561 is employed. Moreover, for causing the magnetic tape to accurately travel on the order of microns, a tape guide is provided within the tape path, to thereby control the magnetic tape. Furthermore, for maintaining a favorable "head touch", it is necessary to adjust the attitudes or postures, and height of the magnetic heads in the azimuth direction, hinged direction and tilting direction, etc., with respect to the tape travelling face, and the individual magnetic heads are mounted through suspension mechanisms having the adjusting functions as stated above.

However, in the conventional arrangement as described above, since various adjusting mechanisms must be provided around the magnetic heads for recording and reproduction and the tape guide, size reduction in the vicinity of the magnetic heads and the tape guide is undesirably restricted, thus obstructing achievement of a compact size of the apparatus on the whole. Particularly, in the magnetic recording and reproducing apparatus which employs the magnetic tape, although it is essential to shift from the open reel type to the cassette type from the viewpoint of operation, the difficulty in the size reduction around the magnetic head and the tape guide presents a large obstruction for the shifting into the cassette construction of the magnetic tape.

OBJECTS AND SUMMARY OF THE INVENTION

Accordingly, an essential object of the present invention is to provide a magnetic recording and reproducing apparatus capable of maintaining a synchronous relation between the reproducing data and recording data at high accuracy, with substantial elimination of disadvantages inherent in the conventional apparatuses of this kind.

Another object of the present invention is to provide a magnetic recording and reproducing apparatus of the above described type which is simple in construction and compact in size.

In accomplishing these and other objects, according to one preferred embodiment of the present invention, there is provided a magnetic recording and reproducing apparatus which includes a tape guide unit having a set of spaced two tape guide substrates, a spacer provided between said two tape guide substrates so as to dispose said tape guide substrates through a predetermined interval in approximately a parallel relationship to each other, and guide poles for guiding the surface of a magnetic tape, arranged to extend through front portions of said tape guide substrates in a direction generally perpendicular to surfaces of said tape guide substrates, and a plurality of magnetic heads fixed, in a state where their postures are adjusted, to said tape guide unit.

By the arrangement according to the present invention as described above, since the magnetic heads are integrally fixed to the tape guide unit in the state adjusted for their postures, no angular adjusting mechanism is required in the respective azimuth direction, hinged direction and tilting direction, for adjusting the postures of the magnetic heads. Accordingly, a compact size around the tape guide unit may be achieved for reduction of size of the magnetic recording and reproducing apparatus.

BRIEF DESCRIPTION OF THE DRAWINGS

These and other objects and feature of the present invention will become apparent from the following description taken in conjunction with the preferred embodiment thereof with reference to the accompanying drawings, in which.

DETAILED DESCRIPTION OF THE INVENTION

Figure 1:
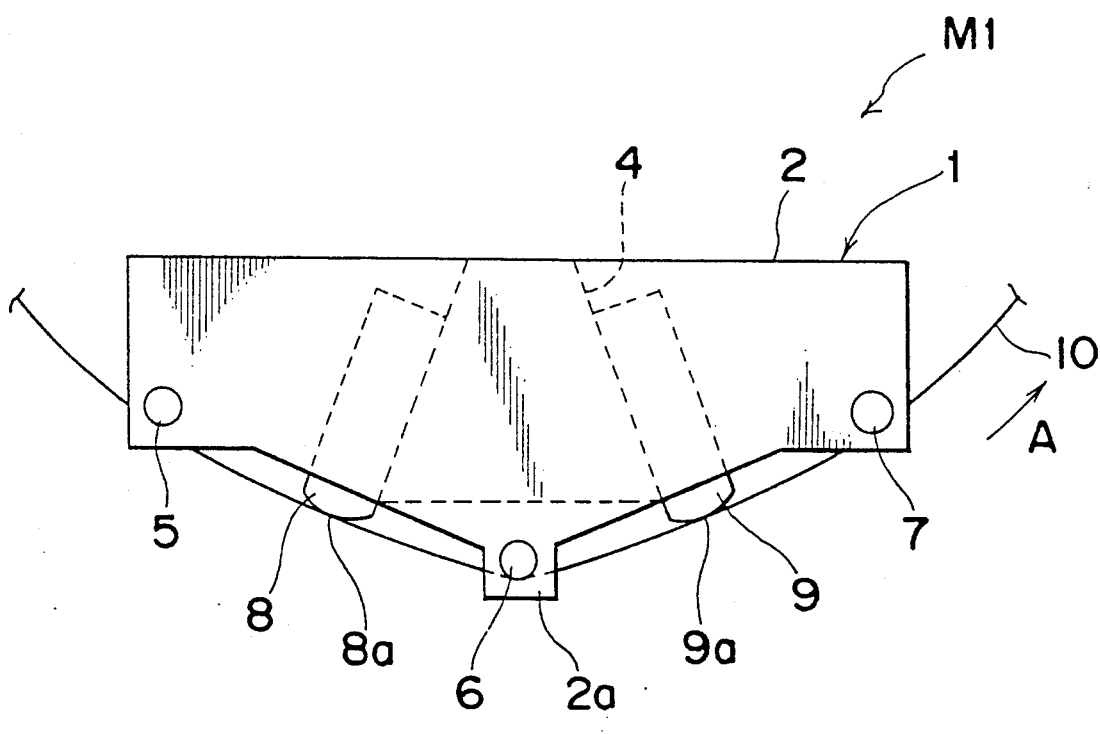
FIG. 1 is a top plan view showing a magnetic recording and reproducing apparatus M1 according to one preferred embodiment of the present invention which includes a tape guide unit, and reproducing and recording heads provided thereon.

Before the description of the present invention proceeds, it is to be noted that like parts are designated by like reference numerals throughout the accompanying drawings.

Figure 2:
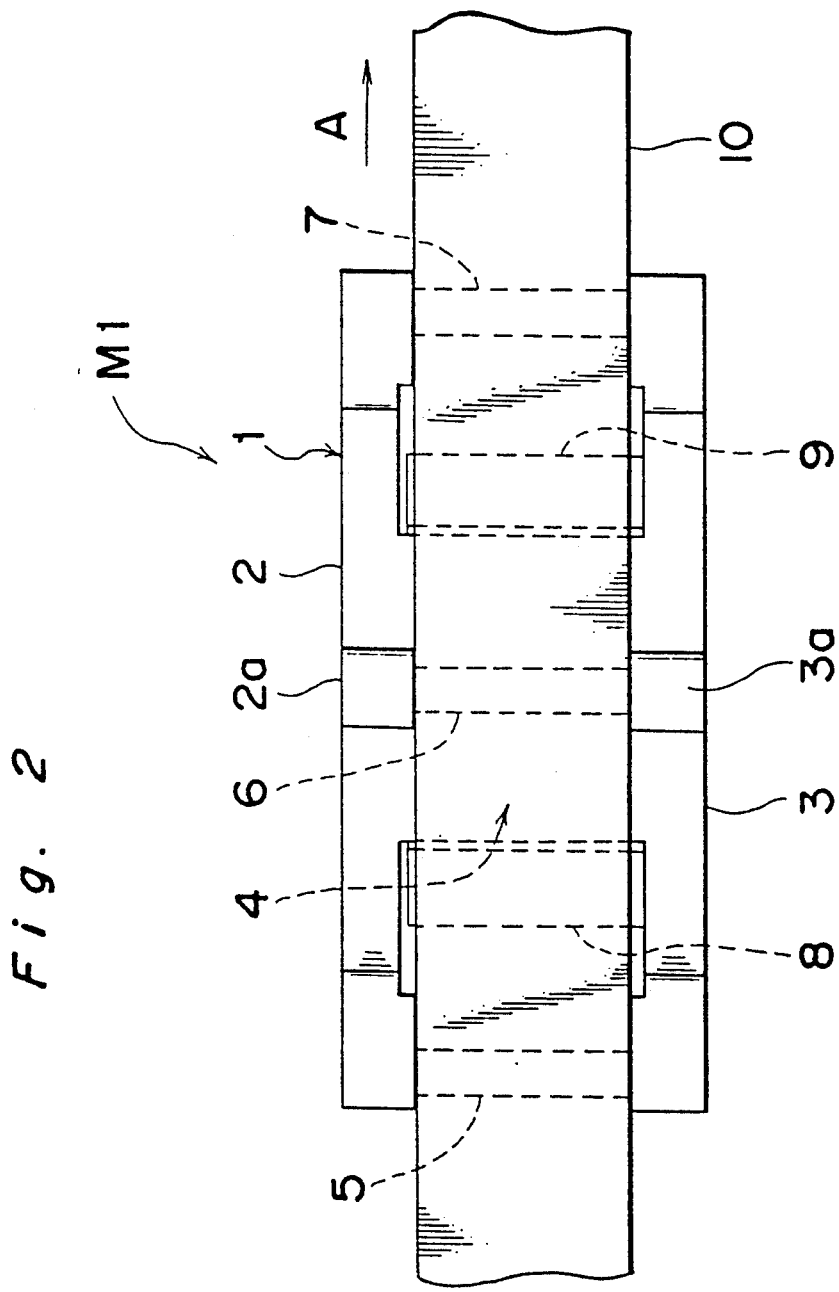
FIG. 2 is a front elevational view of the magnetic recording and reproducing apparatus M1 of FIG. 1.

Referring now to the drawings, there is shown in FIGS. 1 and 2, a magnetic tape recording and reproducing apparatus M1 according to one preferred embodiment of the present invention, which generally includes a tape guide unit 1 having an upper substrate 2, a lower substrate 3, a spacer 4 and guide poles 5, 6 and 7, and a reproducing head 8 and a recording head 9 fixed to the tape guide unit 1 as described in detail hereinbelow.

As shown in FIGS. 1 and 2, the upper substrate 2 and the lower substrate 3 have a symmetrical shape, and are respectively formed with forwardly projecting portions 2a and 3a at central portions thereof as shown. Between the upper substrate 2 and the lower substrate 3, the spacer 4 in an angular column having a trapezoidal cross section is disposed, with the bottom side of the trapezoidal shape directed forwardly i.e. downwardly in FIG. 1.

Moreover, the guide poles 5, 7 and 6 each of a round rod-like shape are extended through the upper substrate 2 and the lower substrate 3 respectively in front portions at opposite ends and the forwardly projecting portions 2a and 3a of the substrates. At least the sliding surfaces with respect to the magnetic tape 10, in the above guide poles 5, 6 and 7 and the upper and lower substrates 2 and 3, should preferably be formed by a material not readily damaging to the magnetic tape 10, and yet having a high abrasion resistance. The distance between the upper substrate 2 and the lower substrate 3 around the guide poles 5, 6 and 7 is so designed that, although generally equal to the width of the magnetic tape 10, it is slightly larger than the width thereof for guiding the magnetic tape 10 travelling in a direction A. Thus, the interval between said substrates 2 and 3 is maintained at the above distance by the three guide poles 5, 6 and 7 and the spacer 4.

Meanwhile, on one side face and the other side face of the spacer 4, inclined towards the bottom side of the trapezoidal cross section in the tape guide unit 1, the reproducing head 8 and the recording head 9 are provided along the spacer 4, and the upper and lower substrates 2 and 3. The reproducing head 8 and the recording head 9 are arranged in this order along the direction A which is the travelling direction of the magnetic tape 10, with their sliding faces 8a and 9a with respect to the magnetic tape 10 projecting forwardly.

In the above construction, for attaching the reproducing head 8 and the recording head 9, the tape guide unit 1 is first assembled in the order of the upper substrate 2, lower substrate 3, spacer 4, and guide poles 5, 6 and 7, and then, the reproducing head 8 and the recording head 9 are mounted thereon. In order to satisfy the track pattern of a predetermined track of the magnetic tape 10 and also to achieved a favorable "head to tape contact", the reproducing head 8 and the recording head 9 are respectively subjected to adjustments of postures or attitudes thereof, i.e. angular adjustments in the azimuth direction, hinged direction and tilting direction, and also, to adjustments of projection forwardly, i.e. adjustments of projecting amount in the direction of the magnetic tape 10, and further to the positional adjustments in the widthwise and travelling directions of the magnetic tape 10, and thereafter, fixed by a bonding material and screws.

As described so far, since the reproducing head 8 and the recording head 9 are assembled onto the tape guide unit 1 after effecting various adjustments, it is not necessary to add adjusting mechanisms to the heads 8 and 9 individually, and accordingly, the construction of the apparatus may be simplified for reduction of size.

On the other hand, when the magnetic tape 10 is driven, it is guided by the guide poles 5, 6 and 7, and the upper and lower substrates 2 and 3, in the state where the magnetic tape is wound around the guide poles 5, 6 and 7 by a predetermined angle, and travels in the direction A as it is contacting the sliding surfaces 8a and 9a of the reproducing head 8 and the recording head 9. In this case, the magnetic tape 10 can move smoothly, with only a small degree of waving being produced, through guiding by the upper and lower substrates 2 and 3.

Figure 3:
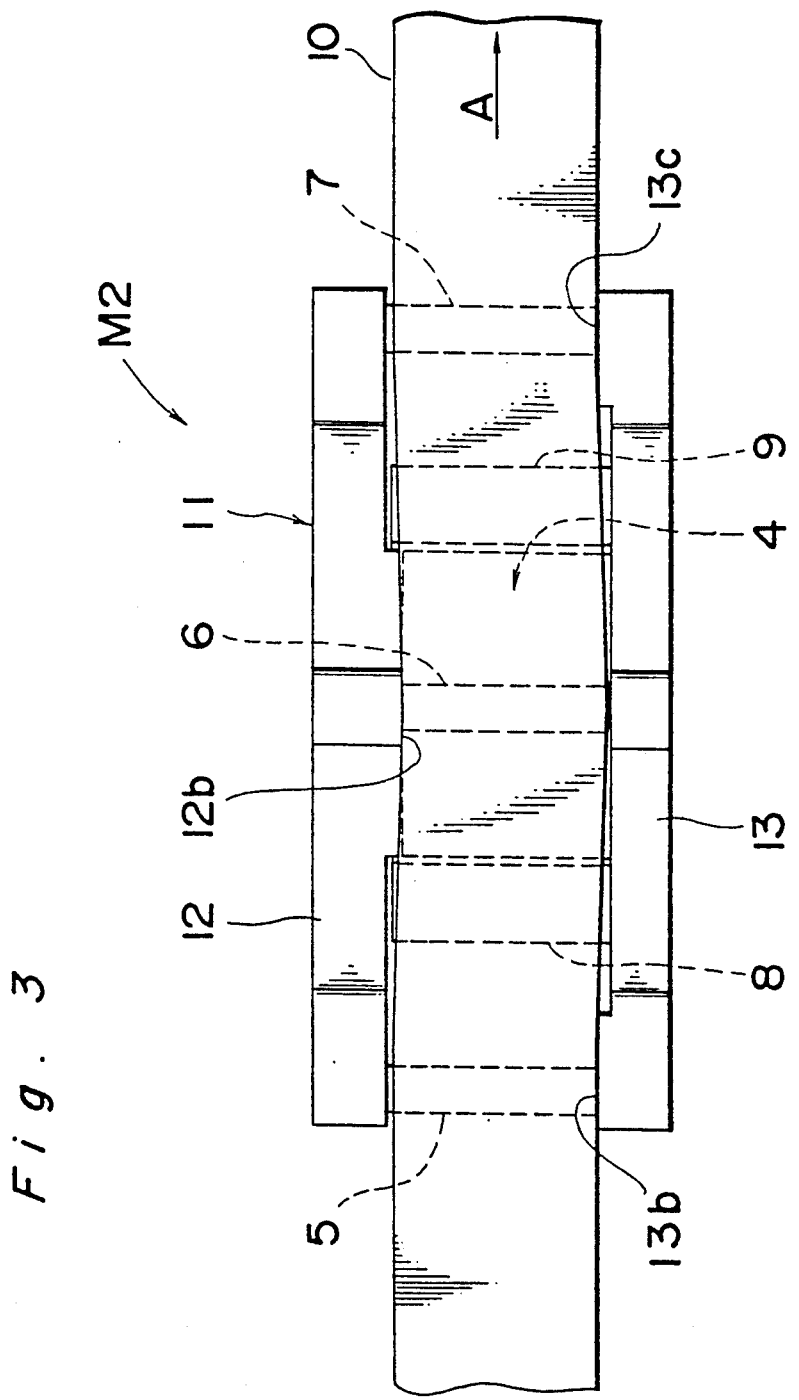
FIG. 3 is a front elevational view of a magnetic recording and reproducing apparatus M2 according to a second embodiment of the present invention, showing the state in which the magnetic tape is guided by the tape guide unit.
Figure 4:
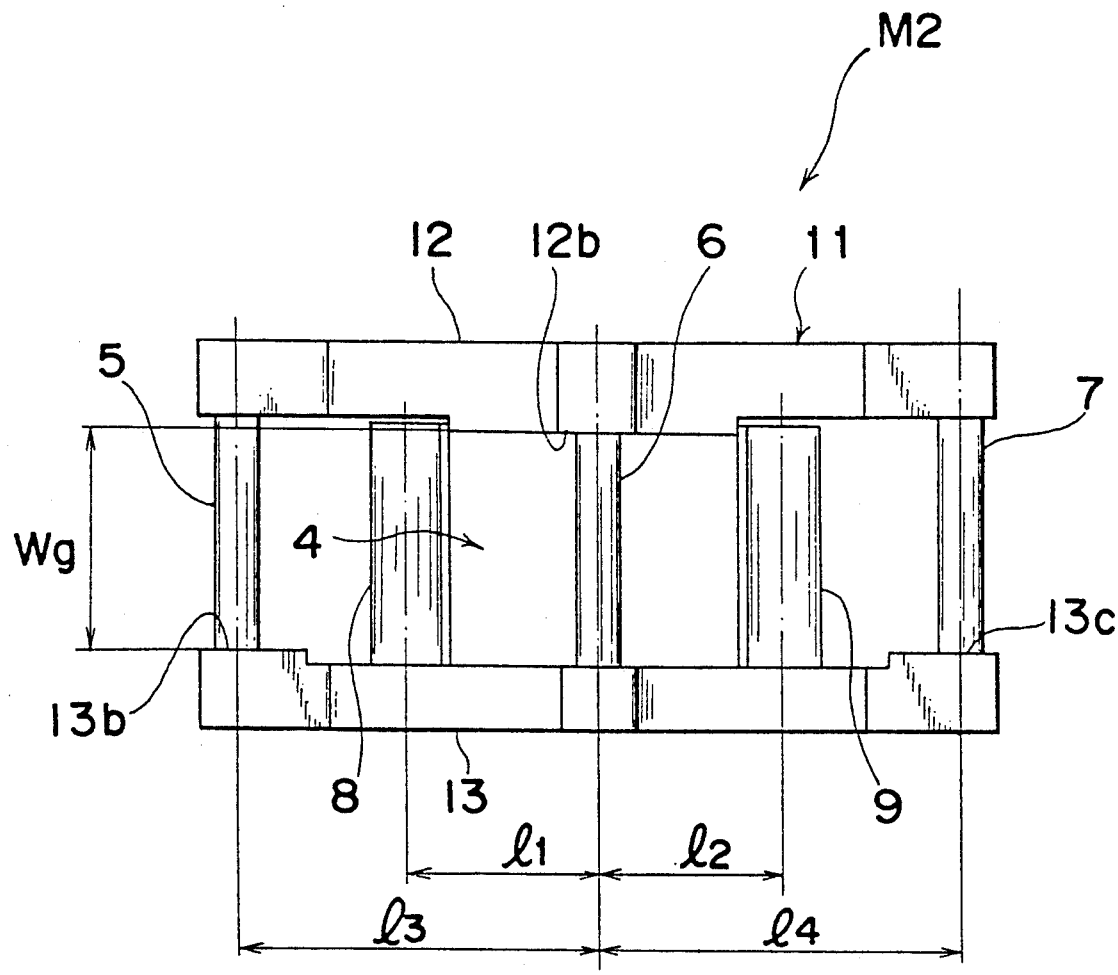
FIG. 4 is also a front elevational view of the apparatus M2 of FIG. 3, which particularly shows a positional relationship of the tape guide unit, and reproducing and recording heads provided thereon.
Figure 5:
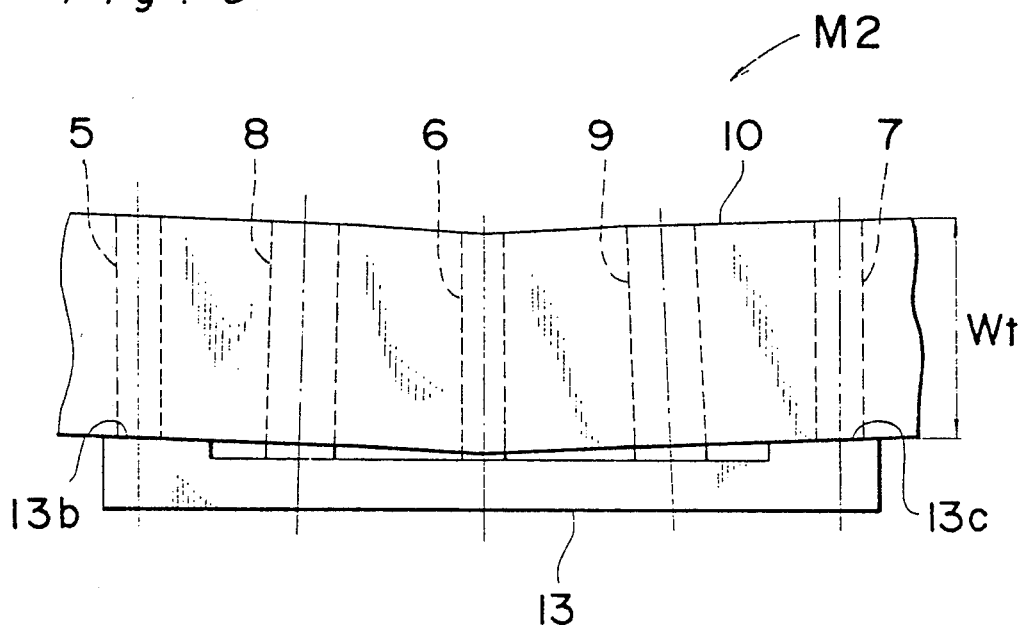
FIG. 5/ is a diagram explanatory of the state of travelling of the magnetic tape in the apparatus M2.

Referring further through FIGS. 3 to 5, there is shown a magnetic recording and reproducing apparatus M2 according to a second embodiment of the present invention, in which like parts in FIGS. 1 and 2 are designated by like reference numerals for brevity of description.

As shown in FIGS. 3 and 4, the magnetic recording and reproducing apparatus M2 also has a tape guide unit 11 constituted by an upper substrate 12, a lower substrate 13, a spacer 4 and guide poles 5, 6 and 7.

In this embodiment, however, the upper substrate 12 and the lower substrate 13 are not in a symmetrical configuration, but in the upper substrate 12, its under surface around the inserted portion of the central guide pole 6 slightly protrudes downwardly with respect to the undersurfaces thereof around the inserted portions of the guide pole 5 at a supply side and of the guide pole 7 at the take-up side, while, in the lower substrate 13, the upper surfaces thereof around the inserted portions of the guide pole 5 at the supply side and of the guide pole 7 the take-up side protrude upwardly to a certain extent, as compared with its uppersurfaces around the inserted portion of the central guide pole 6.

Accordingly, in the upper substrate 12, the undersurface thereof around the inserted portion of the central guide pole 6 serves as a tape guide face 12b, and in the lower substrate 13, the upper surfaces thereof around the inserted portions of the guide pole 5 at the supply side and of the guide pole 7 at the take-up side respectively serve as the tape guide faces 13b and 13c.

The interval between the tape guide face 12b in the above upper substrate 12 and the tape guide faces 13b and 13c in the lower substrate 13, i.e. a tape guide width Wg (FIG. 4) is designed to be slightly smaller than a tape width Wt (FIG. 5) of the magnetic tape 10. The distance between an axis of the central guide pole 6 and magnetic gap of the reproducing head 8 on the tape path is represented by 11, and the distance between an axis of the central guide pole 6 and magnetic gap of the recording head 9 on the tape path is denoted by 12. The distance between the axis of the central guide pole 6 and that of the guide pole 5 at the supply side on the tape path is indicated by 13, while the distance between the axis of the central guide pole 6 and that of the guide pole 7 at the take-up side on the tape path is represented by 14.

The extent for setting the tape guide width Wg smaller than the tape width Wt varies according to the tape width Wt, distances 13 and 14, and the winding angle of the magnetic tape 10 around the respective guide poles 5, 6 and 7. For example, on the assumption that the tape width Wt is 8 mm, the distance 13 or 14 is approximately 20 mm, and the winding angle of the magnetic tape 10 around the guide poles 5, 6 and 7 is about 200, it is proper to set the tape guide width Wg smaller than the tape width Wt by approximately 10 to 60 μm.

In the above arrangement of FIG. 4, favorable travelling characteristics of the magnetic tape may be achieved.

More specifically, in the arrangement of the first embodiment of FIGS. 1 and 2 described earlier, scattering is present in the interval between the upper substrate 2 and the lower substrate 3, and moreover, scattering of about ±10 μm is also present in the width of the magnetic tape 10. Therefore, in the worst case, there is a possibility that the interval between the upper substrate 2 and the lower substrate 3 becomes larger than the tape width by several tens of microns. In such a case, it is difficult to cause the magnetic tape 10 to travel by maintaining the positional relation on the order of microns with respect to the respective magnetic heads 8 and 9.

Meanwhile, according to the apparatus M2 of the second embodiment in FIGS. 3 to 5, the edge portions in the widthwise direction of the magnetic tape 10 travelling in the direction A as it is guided by the tape guide unit 11 are arranged to alternately slide on the tape guide faces in such an order as the lower tape guide face 13b, the upper tape guide face 12b, and then, the lower tape guide face 13c. Thus, travelling of the magnetic tape 10 through a positional relation with respect to the magnetic heads 8 and 9 on the order of microns becomes possible, since the magnetic tape is properly guided by the tape guide face 12b of the upper substrate 12, and the tape guide faces 13b and 13c of the lower substrate 13.

It should be noted here that, in the above case, as shown in FIG. 5, the magnetic tape 10 travels between the guide poles 5 and 6 as it is inclined downwards towards the guide pole 6 at an angle represented by $$\tan^{-1}((Wt-Wg)/l3),$$

and between the guide poles 6 and 7 as it is inclined upwards towards the guide pole 7 at an angle represented by $$\tan^{-1}((Wt-Wg)/l4).$$

Accordingly, in the arrangement of the second embodiment, it is necessary to mount the reproducing head 8 and the recording head 9 onto the tape guide unit 11 by correcting the above angles in order to eliminate the azimuth error.

It should also be noted that in the arrangement of this embodiment, the height of the travelling magnetic tape 10 becomes low by a degree as represented by $$(W_t-W_g)\times(l_3-l_1)/l_3$$

at the magnetic gap portion of the reproducing head 8, and similarly, by a degree as represented by $$(W_t-W_g)\times(l_4-l_2)/l_4$$

at the magnetic gap portion of the recording head 9. Therefore, it is required to correct the heights of both heads by the above degrees.

Although the corrections as described above are necessary in the second embodiment, since it is possible to effect the travelling of the magnetic tape 10 at a high accuracy as stated earlier, the disadvantage which requires the corrections may be fully compensated for.

Moreover, setting for the distance between the magnetic gaps and attitudes of the reproducing head 8 and the recording head 9 during assembling of such heads onto the tape guide unit 11, may be readily effected by employing jigs for the purpose (not shown], and by removing such jigs after completion of fixing of the both heads 8 and 9, and thus, the magnetic head unit in which the tape guide unit 11 and both heads 8 and 9 are combined into one unit may be obtained. By the above arrangement, the distance between the heads and "head to tape contact" are compensated for, and, a compact magnetic recording and reproducing apparatus having a high travelling accuracy may be provided.

Figure 6:
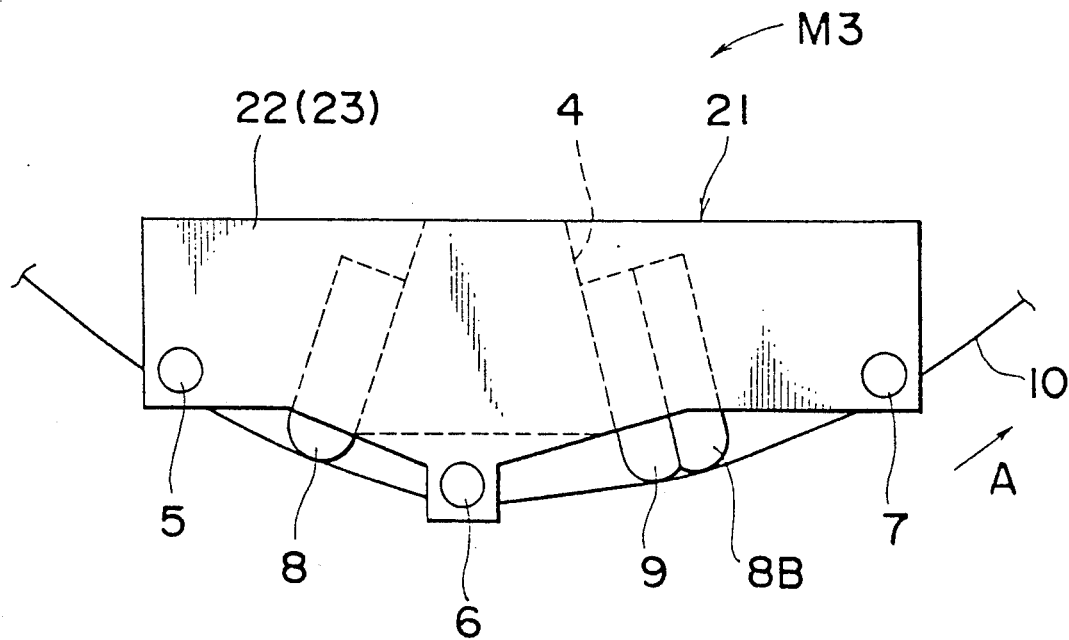
FIG. 6 is a top plan view of a magnetic recording and reproducing apparatus M3 according to a third embodiment of the present invention.

Referring further to FIG. 6, there is shown a magnetic recording and reproducing apparatus M3 according to a third embodiment of the present invention, in which like parts in FIGS. 1 through 5 are also designated by like reference numerals for brevity of description.

In FIG. 6, the magnetic recording and reproducing apparatus M3 includes a tape guide unit 21 having the upper substrate 22 and lower substrate 23 (not particularly shown), spacer 4, and guide poles 5, 6 and 7, and the upper and lower substrates 22 and 23 have the tape guide faces alternately provided in a similar manner as described in the second embodiment, although not particularly shown here, with the reproducing head 8 and recording head 9 being provided along the substrates in that order in the travelling direction A for the magnetic tape 10. In this embodiment, however, in position adjacent to the recording head 9, another reproducing head 8B is provided to be in a set with said recording head 9 as shown, and thus, the reproducing head 8, recording head 9 and reproducing head 8B are disposed in that order along the travelling direction of the magnetic head 10. By the above arrangement, it becomes possible to effect the reproduction immediately after recording on the magnetic tape 10, i.e. to effect so-called "read after write".

It is to be noted here that, the above arrangement may further be modified, for example, to constitute the tape guide unit by providing four guide poles so that one of each of the magnetic heads 8, 9 and 8B may be disposed between each set of two guide poles, although not particularly shown. However, for size reduction of the apparatus, it is preferable to regard the recording head 9 and the reproducing head 8B provided in a set, as a single magnetic head in the disposition, and to install them in the positional relationship as described above.

Accordingly, in the case where the magnetic heads in a set provided side by side are regarded as one magnetic head, and magnetic heads, seemingly in (n-1) pieces are to be mounted, a tape guide unit having n pieces of guide poles is prepared, with each magnetic head being disposed between each set of guide poles. In the above case, it may be so arranged that the magnetic tape 10 which travels as it is guided by the tape guide unit is guided at its edges in the widthwise direction thereof, by the tape guide faces alternately provided on the upper and lower substrates as described earlier.

As is clear from the foregoing description, the magnetic recording and reproducing apparatus according to the present invention is constituted by the tape guide unit including the set of spaced two tape guide substrates, the spacer provided between the tape guide substrates so as to dispose the two tape guide substrates through a predetermined distance an approximately parallel relationship to each other, and the guide poles for guiding the surface of a magnetic tape, arranged to extend through the front portions of the tape guide substrates in a direction generally perpendicular to the surfaces of the tape guide substrates, and a plurality of magnetic heads fixed, in a state where their postures are adjusted, to the tape guide unit.

Therefore, the adjusting mechanism for the attitude of the magnetic head may be omitted for compact size around the tape guide unit, thereby making it possible to reduce the size of the magnetic recording and reproducing apparatus on the whole.

Although the present invention has been fully described by way of example with reference to the accompanying drawings, it is to be noted here that various changes and modifications will be apparent to those skilled in art. Therefore, unless otherwise such changes and modifications depart from the scope of the present invention, they should be construed as included therein.

What is claimed is:

1. A head unit for a magnetic recording and reproducing comprising:
   a tape guide unit including a pair of spaced tape guide substrates wherein each said tape guide substrate includes at least one tape guide face, a spacer provided between said tape guide substrates so as to position said tape guide substrates a predetermined distance apart and approximately parallel to each other, and guide poles for guiding a surface of a magnetic tape, said guide poles extending through front portions of said tape guide substrates in a direction generally perpendicular to surfaces of said tape guide substrates; and
   a plurality of magnetic heads fixed in preadjusted postures with respect to said tape guide unit;
   wherein said tape guide substrates are of a non-symmetrical configuration, and a tape guide width between a tape guide face of the upper tape guide substrate and tape guide faces of the lower tape guide substrate is set to be slightly smaller than a width of a magnetic tape by a predetermined degree.

2. The head unit for a magnetic recording and reproducing apparatus as claimed in claim 1, wherein said plurality of magnetic heads include a reproducing head, a recording head and another reproducing head disposed in a set with said recording head, all of which are arranged in that order along a travelling direction of the magnetic tape for allowing reproduction immediately after recording on the magnetic tape.

3. The head unit for a magnetic recording and reproducing apparatus as claimed in claim 1, wherein said lower tape guide substrate includes one tape guide face at each opposing end of said substrate.

4. The head unit for a magnetic recording and reproducing apparatus as claimed in claim 1, wherein said upper tape guide substrate includes one tape guide face intermediate opposing ends of said substrate.

5. The head unit for a magnetic recording and reproducing apparatus as claimed in claim 1, wherein the lower tape guide substrate includes two tape guide faces, one of said tape guide faces being at a first end of said substrate and the remaining tape guide face being at an opposing end of said substrate, and wherein the upper tape guide substrate includes one tape guide face intermediate opposing ends of said substrate.

6. The head unit for a magnetic recording and reproducing apparatus as claimed in claim 5, wherein said lower tape guide substrate forms a substantially "V" shape when viewed from the front thereof.

7. The head unit for a magnetic recording and reproducing apparatus as claimed in claim 5, wherein said upper tape guide substrate forms a substantially "V" shape when viewed from the front thereof.

* * * * *